United States Patent
Broussard et al.

(10) Patent No.: US 6,922,812 B2
(45) Date of Patent: Jul. 26, 2005

(54) SYSTEM AND METHOD FOR PRESENTING TEXT UPON THE DISPLAY OF A SERVER THAT EMPLOYS AND X WINDOW GRAPHICAL INTERFACE

(75) Inventors: Scott J. Broussard, Cedar Park, TX (US); Kenneth W. Borgendale, Austin, TX (US); Michael R. Cooper, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 714 days.

(21) Appl. No.: 09/903,719

(22) Filed: Jul. 12, 2001

(65) Prior Publication Data

US 2003/0014545 A1 Jan. 16, 2003

(51) Int. Cl.[7] .............................................. G06F 17/00
(52) U.S. Cl. ........................ 715/542; 358/1.15; 345/467
(58) Field of Search ........................ 715/542; 358/1.15; 345/467

(56) References Cited

U.S. PATENT DOCUMENTS

| | | |
|---|---|---|
| 5,394,523 A | 2/1995 | Harris |
| 5,444,829 A | 8/1995 | Kawabata et al. |
| 5,533,174 A * | 7/1996 | Flowers, Jr. et al. ....... 358/1.15 |
| 5,600,770 A * | 2/1997 | Kawabata et al. .......... 715/542 |
| 5,910,805 A | 6/1999 | Hickey et al. |
| 6,054,998 A * | 4/2000 | Miyauchi .................... 345/467 |
| 6,065,008 A | 5/2000 | Simon et al. |
| 6,073,147 A * | 6/2000 | Chan et al. .................. 715/542 |
| 6,148,346 A | 11/2000 | Hanson |
| 6,522,330 B2 * | 2/2003 | Kobayashi .................. 345/467 |

OTHER PUBLICATIONS jcraft.com, "WeirdX—Pure JAva X Window System Server Under GPL", web pages dated Aug. 2, 2000, downloaded from http://web.archive.org/web/20000817004122/http://www.jcraft.com/weirdx/Sep. 13, 2004, used for background.*
T. Sheldon, "Linktionary.com, information on X Windows", 2001, downloaded from http://www.linktionary.com/x/xwindow.html Aug. 30, 2004.*

* cited by examiner

*Primary Examiner*—Joseph Field
*Assistant Examiner*—James H. Blackwell
(74) *Attorney, Agent, or Firm*—Kevin L. Daffer; Daffer McDaniel, LLP; Mark S. Walker, IBM

(57) ABSTRACT

A system and method are disclosed for a Java X font server, capable of displaying high quality text images on a remote display over a network based on the X Window graphical interface. This system and method avoids reliance on the rasterizer in the X server. The Java X font server runs in the client computer and creates the glyphs corresponding to the text to be displayed, using the high performance font rasterizer within the JVM. When the client needs to display text, it makes a request of the X server. If the necessary glyphs are not locally available in the X server, the request is relayed to the Java X font server. The Java X font server then generates the glyphs and transmits them to the X server, where they are cached for subsequent use.

19 Claims, 2 Drawing Sheets

SYSTEM AND METHOD FOR PRESENTING TEXT UPON THE DISPLAY OF A SERVER THAT EMPLOYS AND X WINDOW GRAPHICAL INTERFACE

BACKGROUND OF THE INVENTION

1. Field of the Invention

This invention relates to a computer system and method for displaying text having consistent look and feel upon the display of a server that interfaces with a client via the X window protocol. The text is rendered upon the display using a distributed network of computers, in order to assure the appearance and behavior of the graphical user interface is consistent across multiple diverse computers within the network.

2. Description of the Related Art

The continuing proliferation of faster and more powerful computers has been accompanied by an increase in the use of graphical user interfaces. A graphical user interface (or, GUI) offers many advantages over traditional text-based interfaces. A graphical interface may allow multiple application programs to present output simultaneously, each in a distinct window. Thus, it is not necessary to halt one application in order to interact with another. Instead of entering text-based commands and parameters, the user selects icons with a pointing device, such as a mouse. This is faster, easier and less error prone than making these selections using the keyboard. A GUI can convey a great deal of information to the user in a very accessible format. To a large extent, GUIs have displaced text-based interfaces.

It is possible to efficiently allocate computing and display resources among multiple networked computers through the use of a remote graphical user interface. With a remote GUI, an application may execute on one computer, while the user interface appears on another, possibly physically remote from the first. For example, a remote GUI may be used to allow multiple users sitting at remote terminals to access a central mainframe computer. In this scenario, the users share the computing resources of the mainframe, which simultaneously executes each user's application. A user interface at each terminal receives input from the respective user, and displays output from his application. Implementing a remote GUI raises look and feel issues, since the central computer is able to exchange data with each remote terminal, but has no direct control over how the data is rendered by its user interface. As used herein, the "look and feel" of a GUI refers to such things as the appearance, color and behavior of Buttons, TextFields, Listboxes, menus, etc. and their mouse, keyboard handling and behavior. To further complicate matters, the remote terminals may be of diverse types, with different graphics capabilities. This makes it difficult to properly create the graphical display in the central computer by anticipating the display characteristics of the remote terminal. A more feasible approach is to forward data generated by the application running in the central computer to the terminal in a platform independent format and allow the terminal to create the display.

The X Window System (or simply "X") was introduced in the early 1980's as a cross-platform, client/server system for managing a windowed graphical user interface in a distributed network. X is frequently employed to provide windowing services in networked computers running the Unix operating system, or various other Unix-family operating systems, such as AIX, OS/390 or Linux. For example, an application running in a remote computer can request a graphics display device (i.e., another computer, or a "dumb" terminal) to create a screen graph depicting data generated by the application. The X protocol specifies a device independent format for the exchange of graphic images between (possibly, very different) computers over a network, based on an asynchronous network standard for communication between the two computers. According to this standard, the remote computer making the request has a certain amount of control over the display operation—it can specify general characteristics of the display, such as the relative position and orientation of the objects in the display. However, it relies on the remote display device to perform the low level functions required to actually produce the image.

To create a common windowing system, by which graphic images may be exchanged between different computers, the X protocol specifies both a device dependent and a device independent layer. A device independent description of an image may be sent from computer A to computer B, even if the machines have very different architectures. Upon receiving the device independent image description, the X software running on computer B translates it into a device dependent description, corresponding to the particular hardware configuration on that computer, thus allowing the image to be displayed.

When referring to networked computers, it is common to categorize an individual computer as a "client" or a "server." This nomenclature is based on the information exchanged or services performed between two or more computers. For example, several computers in an office may be connected over a network to a central computer that manages a printer. Use of the printer is shared among the networked computers, who obtain access to it by sending requests to the central computer. In this scenario, the central computer operates as a print server, since it supplies a service (namely, printing) to the various clients with print jobs. Similarly, an application server may execute a prescribed program when requested by a client. For example, a supercomputer may function as an application server by running a finite element simulation on data supplied by a personal computer acting as its client.

It is customary for an application server to be a larger, more powerful computer than its clients, since it often has to serve several client requests at the same time. Notably, X reverses this paradigm. In the X Window model, the server is the system providing graphic display services to the system running the application. Thus, in the example above, the supercomputer would be considered an X client if, after completing its calculations, it called upon the graphics resources of a smaller computer to display the results. In a typical scenario, a user seated at an X server computer runs an application on a remote X client computer. X is an event driven interface—requests are made from the client to the server, and events propagate from the server to the client. When the user employs the mouse, keyboard, or a drawing pad to interact with the X client, the client decides how to respond to the input (for example, redraw a window, open a menu, and so forth). The X client then sends a request to the X server, asking for the appropriate action to take place. In response, the X server interacts with the system's graphics adapter, whereby the appropriate output is displayed on the user's screen, and relays this event back to the X client. Note that the X server does not initiate actions itself; it only performs actions that are requested by the X client.

Strictly speaking, the terms X client and X server may denote software programs fulfilling the functions described above, as opposed to the computers associated with these functions. For this reason, it is possible for an X client and an X server to reside on the same machine. In general, however, the client and server programs are on separate machines, connected by a network. Throughout the remainder of this application, it will be assumed that this is the case. Also, the terms X client and X server will be used within the context of this application to denote the client and server programs, respectively, rather than the computer platform on which they reside.

An issue that arises regarding the use of a remote GUI is that of look and feel consistency. Unlike most other windowing systems, such as Windows and Macintosh, X itself provides no inherent look and feel. Instead, each application provides its own look and feel. However, once a graphic image is received from the X client, the exact manner in which it is displayed depends entirely on the X server. For example, if the image contains text, the appearance of the text may vary according to which fonts are available in the X server, or the particular text drawing routine it uses. Thus, the GUI associated with an application may present a substantially different (and sometimes unsatisfactory) look and feel, depending on the X server being used to display it.

In the evolution of modern programming languages, the object-oriented paradigm has arisen to enable faster development of complex software programs. It encourages the use of consistent interfaces between program modules, and is conducive to the creation of reusable code. These features are highly advantageous in the development of large, intricate software programs, requiring the coordinated effort of several programmers. A departure from traditional programming languages, the object-oriented paradigm is based on objects, rather than procedures. Object-oriented programming (OOP) takes the view that what we really care about are the objects we want to manipulate rather than the logic required to manipulate them. The fundamental entities in an OOP language are classes created by the programmer, which possess properties appropriate for their intended purpose. Once a class has been defined, one or more objects can be created as instances of the class. Individual objects possess all the attributes of the class they represent. For example, a program for a graphical user interface might contain objects such as windows, menus, buttons, etc. having properties such as color, size, location on screen, etc. In addition to their properties, objects also have methods. Methods are actions supported by the object, by means of which they interact with other objects or respond to external events. In most OOP languages, it is possible to define new classes as extensions, or subclasses, of previously defined classes. In such cases, the child class inherits the properties and methods of the parent class, in addition to further methods and properties introduced by the programmer in the child definition. For example, a "jet" class can be defined as a child of an existing "airplane" class, with added properties, such as "turbine velocity." Once the subclass exists, the programmer is free to create new objects with jet-like properties.

Java is a modern OOP language, designed with an emphasis on portability. As used herein, the term "platform" refers to a specific combination of hardware and operating system. More specifically, a platform consists of an operating system, the computer system's coordinating program, which in turn is built on the instruction set for a processor or microprocessor, the hardware that performs logic operations and manages data movement in the computer. A software program is said to be "portable" across various platforms if the program can run without modification on any of those platforms. This "write once—run anywhere" principle is the underlying philosophy behind programming languages such as Java. Java was introduced by Sun Microsystems in 1995 for use in the distributed environment of the Internet. It is an object-oriented programming language that can be used to create complete applications either for execution on a single computer, or to be distributed among servers and clients in a network.

The portability of Java depends on the presence of a Java virtual machine (JVM) in the target computer (i.e., the computer on which the Java application is to execute). A JVM "translates" the generic Java code into instructions specific to the target machine (i.e., "native" code) at runtime. Therefore, the same Java program can run without modification on any computer for which a JVM exists.

Among the uses for Java is GUI development, where the portability of Java code is highly advantageous. As used herein, the "look and feel" of a GUI refers to such things as the appearance, color and behavior of Buttons, Listboxes, and other graphical controls used to interact with the program. Often, a software program is intended to run on various machines, or under various operating systems, while maintaining a consistent look and feel. If the GUI is written in Java, a great deal of the code can be common across platforms, since Java is portable. This shortens development time, since the developer only has to write one version of the GUI code to be ported to all of the desired target machines or operating systems. It also improves maintainability of the code. When bug fixes or feature upgrades are necessary, they are confined to one version of the code, rather than several machine/system-specific versions.

Unfortunately, the portability of Java does not guarantee a completely consistent look and feel for Java applications in distributed computing environment, such as a Unix computer network employing the X Window system. According to the remote GUI concept of X, the application and its graphical interface may reside on two entirely different machines. Traditionally, Java applications create their user interface using a software interface known as the abstract windowing toolkit (AWT). The AWT is a type of application program interface (API) providing windowing support for Java applications. An API is an interface used by applications to access operating system services. By making calls to the API, an application program can invoke the resources of the operating system, for example, to write to the computer screen or detect the position of the mouse cursor. In Unix systems, where the GUI is separated from the application, the AWT relies on Motif. Motif contains a library of routines that make the creation of user interfaces in an X environment fairly easy and straightforward. The Motif libraries handle most of the low-level event handling tasks common to any GUI system. The AWT, which is part of Java, utilizes the features of Motif on Unix (just as it uses Win32 APIs on Windows), to provide GUI frames and controls (such as push buttons, menus, listboxes, entry fields, etc). Because the GUI is remote from the application, the user can be sitting at a display that is physically located in a different location from the computer that is running the Java application program. The application (X client) uses the network to communicate drawing commands to the remote display (X server), where the user is actually sitting. However, due to the platform-dependence of the AWT, different X servers may implement these drawing commands differently. As a result of these dissimilarities, the appearance of buttons, lists, checkboxes, etc. created by a Java-based GUI may vary when the GUI is displayed on different X servers.

Thus, in the case of a remote graphical interface such as that provided by X, the application has no direct control over specific characteristics of the GUI presentation—instead, this is a function of the hardware and software in the X server. This gives rise to a number of problems affecting the consistency of the GUI look and feel, and, in particular, the quality and performance of text generation.

Among these problems is the fact that Java applications cannot avail themselves of the high quality font rasterizer (T2K/Freetype) included in IBM's version of the Java JVM. A font is a complete character set of one point size and face—e.g., courier bold, 12 point. A font rasterizer transforms font codes (e.g., ASCII or Unicode) into glyphs. A glyph is the visual representation of a character within a given font, which may be displayed on the computer screen as text. For example, an italic 'a' and a roman 'a' are two dissimilar glyphs representing the same character. The italic 'a' and the roman 'a' have dissimilar pixel bitmaps, and therefore, dissimilar glyphs. For Java applications running on platforms with a local display, the T2K rasterizer in the JVM draws high-quality text to the screen. However, in remote displays the text rendering is delegated to the X server's rasterizer. Unfortunately, in some of the Unix family operating systems, such as AIX, the rasterizer does not provide clear or "crisp" text renderings. Furthermore, even if the quality of the text is acceptable, its glyph appearance may not be consistent when presented on different servers, due to variations in the Motif implementations installed on different platforms. Moreover, some X servers cache an entire set of glyphs for each font that's needed. In the case of Asian text, the number of glyphs can be quite large, which can degrade the servers performance.

TextArea and TextField in the Java legacy AWT serve as another example of the inconsistencies and limitations in the implementation of controls in the various Unix family platforms. On some platforms, TextArea and TextField controls are limited to only one encoding and one font at a time. An encoding is a mapping of binary numbers to the individual characters in a character set. For example, the traditional ASCII (American Standard for Information Interchange) encoding assigns an integer from 0 to 255 to each of the upper and lower case letters of the standard Phoenician alphabet, along with the numerals from 0 to 9 and various common typographical symbols. In a Unix system there are typically a variety of "localized" encodings, generally associated with foreign character sets. Being limited to one font at a time could present a problem, for example, when displaying a TextField with a string containing both Courier and Symbol fonts. Likewise, text containing mixed language characters would confound a system restricted to one encoding at a time. Furthermore, many operating systems do not support the use of Unicode encodings. Unicode is a new standard for associating binary codes with text or script characters. Officially called the Unicode Worldwide Character Standard, it is a system for the interchange, processing, and display of written text in all the major languages of the modern world. Currently, the Unicode standard contains 34,168 distinct coded characters derived from 24 supported language scripts, covering the principal written languages of the world. Unicode support is built into Java, and is important for a universal, platform-independent GUI. However, reliance on the diverse platform-specific AWT implementations presents an obstacle to the general use of Unicode.

Beyond these look and feel issues, maintenance and support of the numerous platform-specific versions of the AWT can be burdensome, and achieving uniform behavior among them practically impossible. In order to add a new feature to the GUI, for example, it is necessary to modify dissimilar code in the AWT for each supported platform. Moreover, it may be extremely difficult to obtain consistent behavior from the added feature, because of code differences in the platform-specific AWTs. Moreover, some of the sundry Motif implementations, on which the AWT depends, are not entirely stable, further complicating troubleshooting efforts. It is not possible to merge the diverse heavyweight AWT variants because, as noted earlier, they are highly hardware dependent. Consequently, there can be no universal AWT that is compatible with the disparate hardware configurations on each of the various platforms.

In view of these and other related difficulties, it would be desirable to have a single API for Java applications that would work with all supported Unix-family platforms in an X Window-based distributed network. The desired API should provide consistent, high-quality text drawing, along with support for multi-font strings and international character sets.

SUMMARY OF THE INVENTION

The problems outlined above are in large part addressed by a system and method to implement a server of fonts using Java and the X window System. The present font server is hereinafter referred to as the Java X font server. The Java X font server provides accurate, high quality text display in the context of a remote graphical interface over a distributed network managed by the X Window System. Many of the problems previously described derive from the hardware dependence of the graphics system in the X server, which causes the appearance, and even the accuracy, of displayed text to vary from one platform to another.

In an embodiment of the system and method disclosed herein, the X client is a Java program running in a first computer, connected via a network to a second computer which is equipped with a display device (such as a monitor). When it is necessary for the client program to display text (e.g., a message prompting the user), it sends a request to an X server program running on the second computer. Along with the desired text string, the request contains an XLFD (X logical font descriptor), defining the font, point size, and other visual attributes of the displayed text. If the glyphs (graphical representations of the characters) required to display the text are not available in the second computer, the request is relayed over the network (i.e., returned) to a Java X font server program, running in the first computer. The Java X font server generates the needed glyphs and transmits them back to the X server, where they are cached for subsequent use. Using the glyphs, the X server presents the graphical representation of the text on the display device. Advantageously, the Java X font server employs the same font rasterizer and Java virtual machine (JVM) to create these high quality glyphs that support the X client Java program. Consequently, the text is faithfully displayed by the X server. No modification is required to the X server to implement the Java X font server.

A method is also disclosed, for remote display of text created by a Java X client program running on a first computer on a display device attached to an X server program running on a second computer, where the first and second computers are connected over a network supported by the X Window System. The method includes the X client program creating a text string, then sending a request to the X server program to display the text. If the X server has access (within the second computer) to a graphical representation of the text, it presents the graphical representation on the display device. Otherwise, it forwards the display request to a Java X font server program running in the first computer. In the latter case, the method proceeds by using a font rasterizer within the JVM in the first computer to create the graphical representation of the characters (i.e., glyphs) needed to display the text, transmitting these glyphs to the X server. The method concludes by the X server displaying the text and caching the glyphs for subsequent use.

A computer readable storage is also disclosed, containing a first and a second computer, coupled to each other over a network supported by the X Window System, with a display device coupled to the second computer. An X client Java program and a Java X font server program run on the first computer, and an X server program runs on the second program. The first computer also contains a font rasterizer within a JVM.

The X client program can generate a text string and forward a first request to display the text string to the second computer over the network. The response to this request by the X server program depends on whether a graphical representation of the text is available within the second computer. If so, the X server displays the graphic representation on the display device. Otherwise, the X server forwards the display request over the network to the Java X font server on first computer, where the font rasterizer creates the necessary graphical representation, and the Java X font server transmits it back to the X server on the second computer. When the X server receives the graphical representation, it presents it on the display device and places it in cache memory for subsequent use.

BRIEF DESCRIPTION OF THE DRAWINGS

Other objects and advantages of the invention will become apparent upon reading the following detailed description and upon reference to the accompanying drawings in which.

Figure 1:
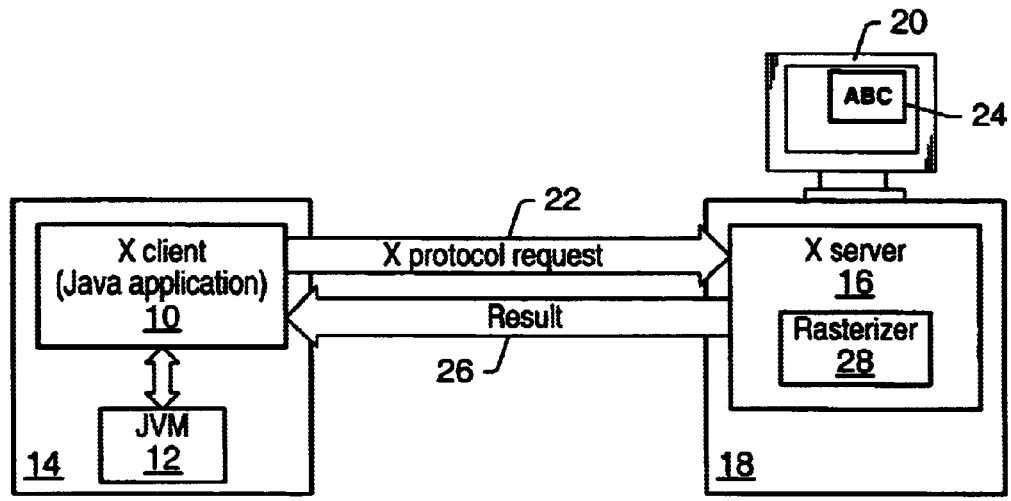
FIG. 1 illustrates remote text display between two computers connected by an X Window network, under the original implementation of Java in which the X client requests the X server to display a character string.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The X Window System is a windowed graphical user interface for use in a distributed computer network. It is commonly used in conjunction with the Unix operating system and its variants, such as AIX, OS/390 and Linux, and provides a means of remotely interacting with an application program running on a different computer from the one on which the GUI is displayed. However, as explained earlier, the look and feel of the GUI is not consistent across platforms, but is dependent on the hardware and software configuration of the particular X server that presents the GUI. As a result, the appearance and behavior of some controls may vary, and many important operations (such as text drawing) may be implemented differently.

Text drawing is an area where these inconsistencies are particularly glaring. FIG. 1 illustrates a legacy X client/server system, in which the X client 10 (a Java application) running on a remote computer 14 needs to display a string 24 ("ABC") associated with a text-based control (e.g., Label) created by the application. The string is to be displayed on the screen 20 of the user's computer 18, as part of a graphical user interface for the X client 10. The format of the text is determined by the JVM 12. However, the text cannot be displayed on computer 14 (which may not even have a monitor or display hardware), and is forwarded to the X server 16. In order to do this, the Java application calls the DrawString method of the text-based control. This call is ultimately translated into an X protocol request 22 sent to the X server 16, running on the user's computer 18. The request 22 contains the XDrawString command along with the desired string, which is in X logical font descriptor (XLFD) format. In addition to the string itself, the XLFD format contains information about how the string is to be displayed, including the desired font, point size, bold or italic setting, etc. The X server contains a font rasterizer 28, which creates a graphical representation of the characters in the string received from the X client. As part of the X server's response to the request from the client, it also sends back a result 26 containing information pertaining to the size, location, etc., of the graphic representation it has created for the string. When creating a graphical representation for the string, the X server must convert the Unicode encoding of the characters to its own localized encoding. This is an inherently lossy process. For example, a Unicode-encoded string may contain a combination of characters from more than one language, but the server attempts to use one encoding for the entire string. This could result in some of the characters being displayed as "?" or "space." The server also attempts to match the font requested in the XLFD with one of its available fonts. If this is not possible, the nearest approximation is used. Thus, if the exact font required is not available to the X server the appearance of the displayed text string may correspond poorly to the string originally created by the X client. For example, the color or other attributes of the font may be inconsistently presented. In addition, certain fonts may not be supported at all—some versions of Linux, for example, do not support Chinese characters.

In addition to the inconsistencies described above, the method for remote display of text illustrated in FIG. 1 also suffered from performance problems. A font property file specifies the encodings for a set of characters and a specific font. The font property file in the server, together with the rasterizer, determines which glyphs are used to represent the characters in a given font. In AIX and other Unix releases, there are two sets of font property files, non-UTF8 and UTF8. The UTF8 font property file is based on Unicode, which is a comprehensive, multinational encoding. The non-UTF8 files, on the other hand, contain language-specific encodings. Font property files determine the font search order used by the server when it attempts to match the attributes of the text it displays with those requested by the client. A font that contains characters from more than one character set may be listed multiple times in a non-UTF8 font property file, which causes inefficiency in this matching process.

With UTF8, the fonts are listed just once, but in the case of some Unix variants (e.g., AIX) the server rasterizes the entire font. Since there are on the order of 39,000 glyphs in each Unicode-encoded font and several fonts must typically be loaded, this is can be time-consuming. It is also inefficient in terms of resources, since many of the glyphs comprising a font may not be used, but will be rasterized and stored to memory anyway.

Figure 2:
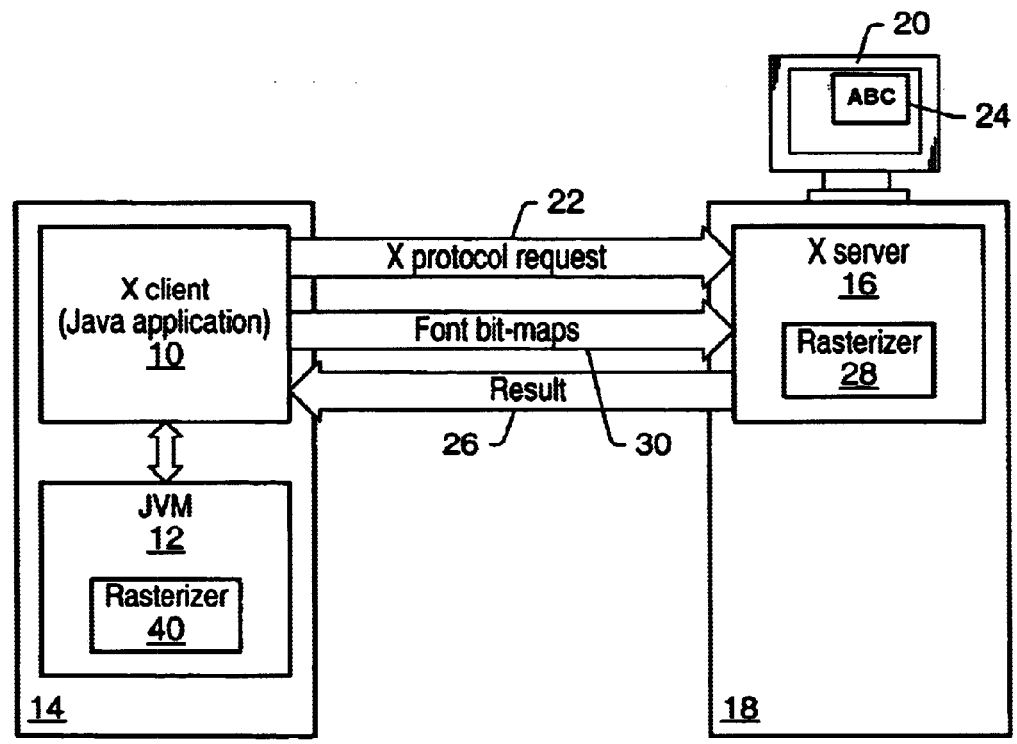
FIG. 2 illustrates remote text display between two computers connected by an X Window network, under a subsequent implementation of Java, in which the X client requests the X server to display a bitmapped image (e.g., a character string)

Following the initial release of Java, attempts were made to address the cross-platform inconsistencies in text rendering. FIG. 2 illustrates one such approach, in which the X client 10 has access to a font rasterizer 40, included as part of the JVM 12 in the remote computer 14. Unlike some of the native font rasterizers, the Java font rasterizer 28 produces very high quality text displays, and also supports advanced features, such as font searching and Unicode support. Font searching refers to the ability to cull matches for characters from among several sets of fonts, rather than just one. This capability allows more accurate rendering of strings that contain multiple fonts. The superior performance of the Java font rasterizer is particularly advantageous in the case of Asian characters, which are composed of intricate glyphs, necessitating very precise graphical representation. To preserve the quality of the text rendered by the Java rasterizer, bitmap images 30 of characters are transmitted from the X client computer 14 to the computer running the X server 18. The X client 10 creates a bitmap image of the region of the screen containing the desired text and displays it. Since the display is remote, this operation is handled by an X protocol request 22 containing the graphics call, XPutImage( ), to the X server 18. The X server 16 displays the text, using the high quality bitmap images created by the Java rasterizer 40 and sent over by the X client 10. In this scenario, the server's font rasterizer 28 is never called upon. Although this solves the cross-platform consistency problem and provides high quality text display, it has a serious disadvantage. Since bitmap image files are typically large, the transmission of font image data can create a bandwidth problem for networked systems. Moreover, the X server is typically incapable of caching the bitmaps. Consequently, each time a character is needed, its bitmap must be retransmitted.

Figure 3:
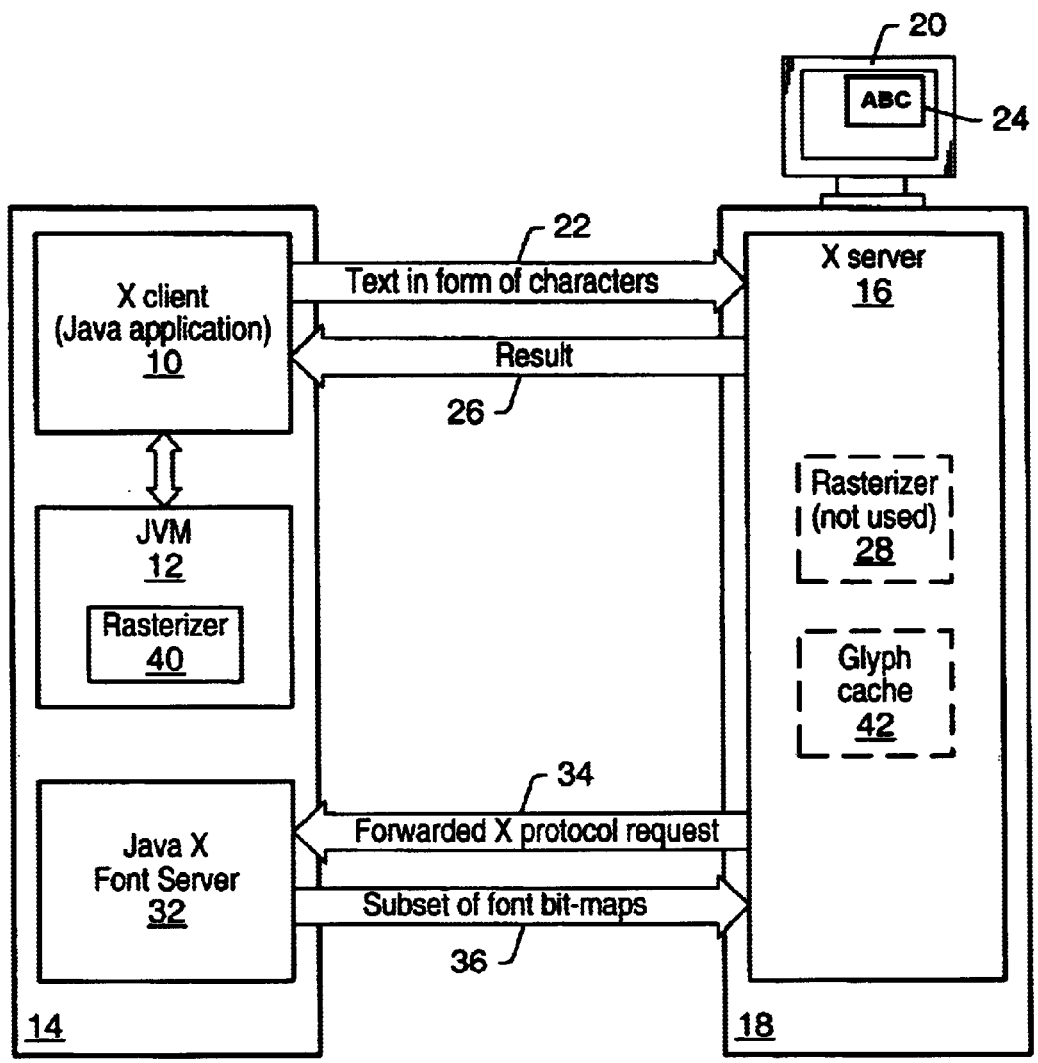
FIG. 3 illustrates an embodiment of the system and method disclosed herein.

An alternative to the approach represented in FIG. 2 is the use of a Java X font server. The Unix system allows for the existence of a font server, which may run either on the same computer as the X server or on a remote computer. Just as the X server provides the graphics support for an X client's GUI, an X font server delivers graphical representations of fonts (i.e., glyphs) in response to an X protocol request. FIG. 3 illustrates an embodiment of the system and method disclosed herein, whereby a Java X font server 32, residing in the same machine 14 as the client application 10 and using the exact same fonts, provides high quality bitmapped fonts to the X server 16 operating in a second computer 18. The X server uses these bitmaps to display text sent by the client, as part of a remote GUI associated with the Java application 10.

The sequence of operations represented in FIG. 3 begins when the Java application makes a method call to display text, such as DrawString("ABC"). The X Window System converts this into an X protocol request 22, containing the command XDrawString("ABC") and the XLFD description of the string. In this case, however, a proprietary form of the XLFD description is used that is not recognized by the X server. Therefore, the X server does not attempt to render the characters with its own rasterizer 28, but instead forwards the request 34 to the Java X font server 32 in remote computer 14. In response to the forwarded X protocol request, the Java X font server 32 invokes the superior font rasterizer 40 within the JVM 12 to render the characters into bitmapped images (i.e., glyphs). In this case, however, the entire font set is not rasterized, but only a subset containing the characters needed. The information regarding which subset of fonts is required by the application is contained in the customized XLDF string. The glyphs corresponding to the desired subset of fonts 36 are then sent back to the X server 16. Note that the amount of data transmitted is far less than in the prior art system represented in FIG. 2., which required the transfer of entire font sets. The glyphs are placed in a cache 42 for ready access by the X server, and displayed 24 on the monitor 20 (or other graphic display device)

The subset of glyphs need not be retransmitted, since the glyphs are cached in a table maintained in the X server 16. Each entry in this table is the graphical representation of a character in a specified font (i.e., a glyph), and the entries are indexed according to the Unicode encoding of the corresponding character. If the table were fully populated, it would contain an entry for each character code. In practice, however, only a subset of the characters is actually needed by the client application. Therefore, the table is sparsely populated, and glyphs are added only when required by the X client. Once the table has been built, subsequent X protocol requests from the X client 10 to display text can be satisfied without involving the Java X font server 32, provided that the necessary characters are represented in the table. The X server 16 refers directly to the table in cache to locate the proper glyph for each Unicode-encoded character requested. If the proper bitmapped images for the requested characters are not available in the table, the request 34 is forwarded to the Java X font server 32 as before, which then supplies the needed glyphs 36 to the X server. An X protocol result 26 is returned to the X client 10, as part of the X server's response to the request from the X client.

The Java X font server provides several advantages for text display in an X Window-based remote GUI. To begin with, since the font rasterizer 40 in the JVM 12 is used to generate the glyphs for the displayed characters, these characters will be displayed exactly as called for by the X client Java application 10. By the same token, the quality of the displayed characters will be consistently good across all of the supported platforms, contributing to better cross-platform GUI consistency. Furthermore, the Java font rasterizer 40 preserves the Unicode character encoding used by the Java application 10. Consequently, the overhead and potential loss of accuracy resulting from a conversion to local encodings (as required by the system of FIG. 1) is avoided.

The Java X font server also provides a performance advantage over the legacy systems represented in FIGS. 1 and 2. Since X server 16 in FIG. 3 is able to cache the glyphs provided by the font server 32, it is unnecessary for the X client 10 to resend bitmaps for characters each time they are displayed, as is the case with the system of FIG. 2. This greatly reduces the amount of data that must be conveyed over the network, alleviating the bandwidth problems associated with that approach. The performance problems associated with the system of FIG. 1 are also avoided, since the system of FIG. 3 does not require the rasterizer 28 in the X server 16 to rasterize the entire font. Instead, the Java rasterizer 40 generates accurate, high-quality glyphs for only the characters that are needed. The Java X font server 32 then transmits 36 the relatively small set of glyphs to the X server 16.

Thus, a Java X font server embodying the system and methods disclosed herein solves the problem of cross-platform consistency in text display within an X Window-based remote GUI associated with a Java application. The Java X font server enables the displayed text to be of high quality, with attributes exactly matching those assigned by the Java client application that originated the text. Furthermore, this is accomplished without an adverse impact on network bandwidth or a loss in system performance. No modification of the X server is required to implement the Java X font server.

It will be appreciated by those skilled in the art having the benefit of this disclosure that this invention is believed to present a Java X font server, for use in providing consistent and accurate text display in a remote GUI in an X Window-based computer network. Further modifications and alternative embodiments of various aspects of the invention will be apparent to those skilled in the art in view of this description. Such details as the type of font rasterizer used in the JVM as described herein are exemplary of a particular embodiment. It is intended that the following claims be interpreted to embrace all such modifications and changes and, accordingly, the specification and drawings are to be regarded in an illustrative rather than a restrictive sense.

What is claimed is:

1. A computer system, comprising:

a display device;

a first computer adapted to execute a client program that is a JAVA application program for generating a first request to a second computer to display a text string upon the display device;

wherein the second computer is coupled to the display device and is adapted to receive the first request and execute a graphic server program to forward a second request to the first computer if a graphic representation is unavailable on the second computer;

wherein the first computer is adapted to execute a font server program for responding to the second request by creating a font rasterizer within a JAVA virtual machine (JVA) running on the first computer, and thereafter forwarding a new graphic representation of the text string to the second computer to make the new graphic representation available to the display; and wherein the second request for the text string forwarded from the second computer to the first computer, comprises an X logical font descriptor.

2. The computer system as recited in claim 1, wherein the graphic server program in the second computer is further adapted to display the graphic representation of the text string on the display device if the graphic representation is available on the second computer.

3. The computer system is recited in claim 1, wherein the second computer is further adapted to store the new graphical representation within a cache memory of the second computer when the new graphical representation is forwarded to the second computer.

4. The computer system as recited in claim 1, wherein the first and second computers use an operating system selected from a group consisting of Unix, AIX, OS/390 and Linux.

5. The computer system as recited in claim 1, wherein the graphic representation and the new graphic representation comprise respective bit maps which, when presented to the display, produce an image of highlighted pixels thereon.

6. The computer system as recited in claim 1, wherein the first and second computers are coupled via a network that comprises an X Window graphical interface.

7. A method for displaying a text string created by a first computer on a display device coupled to a second computer, comprising:

presenting a first request to display a text string to the second computer;

forwarding a second request for the text string to the first computer if a graphic representation of the text string is unavailable on the second computer; and in response to said forwarding of the second request, executing the font rasterizer within a JAVA virtual machine (JVA) running on the first computer for creating a new graphic representation of the text string in the first computer and forwarding the new graphic representation to the second computer, wherein the second request for the graphic representation of the text string forwarded from the second computer to the first computer over the network contains a modified X logical font descriptor.

8. The method as recited in claim 7, comprising displaying the text string on the display device if the graphic representation is available on the second computer.

9. The method as recited in claim 7, further comprising displaying the text string on the display device using the new graphic representation of the text string.

10. The method as recited in claim 7, wherein displaying comprises executing a graphics server program on the second computer to present the graphic representation on the display.

11. The method as recited in claim 7, wherein creating the new graphic representation of the text string comprises using a known set of fonts present in the first computer, rather than using an unknown set of fonts present in the second computer.

12. The method as recited in claim 7, wherein forwarding the new graphic representation to the second computer comprises executing a font server program stored in the first computer.

13. The method as recited in claim 7, further comprising storing the new graphical representation within a cache memory of the second computer when the new graphical representation is forwarded to the second computer.

14. A computer-readable storage device, comprising:

a client program that is a JAVA application program executable upon a first computer for generating a text string and forwarding a first request to display the text string to a second computer;

a graphics server program executable upon the second computer for responding to the first request from the first computer by forwarding a second request for the text string to the first computer, if a graphic representation of the text string is unavailable on the second computer;

a font server program executable on the first computer for responding to the second request from the second computer by creating a font rasterizer with a JAVA virtual machine (JVA) running on the first computer to create a new graphical representation, and thereafter forwarding the new graphic representation or the text string to the second computer; and wherein the second request for the text string forwarded from the second computer to the first computer comprises an X logical font descriptor.

15. The computer readable storage device as recited in claim 14, wherein the graphics server program is further adapted to display the text string if the graphic representation of the text string is available on the second computer.

16. The computer readable storage device as recited in claim 14, wherein the graphics server representation and the new graphic representation comprise respective bit maps which, when presented to the display, produce an image of highlighted pixels thereon.

17. The computer readable storage device as recited in claim 14, wherein the graphics server program, upon receiving the graphical representation forwarded by the font server program, stores said graphical representation in a cache memory attributable to the second computer.

18. The computer readable storage device as recited in claim 14, further comprising an operating system selected from the group consisting of Unix, AIX, OS/360 and Linux adapted to run upon the first and second computers.

19. The computer readable storage device as recited in claim 14, further comprising an X window graphical interface program executable upon the first and second computers to effectuate a network connection.

* * * * *

UNITED STATES PATENT AND TRADEMARK OFFICE
CERTIFICATE OF CORRECTION

PATENT NO. : 6,922,812 B2  
DATED : July 26, 2005  
INVENTOR(S) : Broussard et al.

It is certified that error appears in the above-identified patent and that said Letters Patent is hereby corrected as shown below:

Column 12,  
Line 66, delete "graphics server" and substitute -- graphic --.

Signed and Sealed this

Thirtieth Day of May, 2006

JON W. DUDAS  
*Director of the United States Patent and Trademark Office*